United States Patent
Ybarra et al.

(10) Patent No.: US 6,617,997 B2
(45) Date of Patent: Sep. 9, 2003

(54) METHOD OF DETERMINING RADIO FREQUENCY LINK RELIABILITY IN AN AIRCRAFT TRACKING SYSTEM

(75) Inventors: Kathryn W. Ybarra, Surprise, AZ (US); David J. Johnson, Glendale, AZ (US)

(73) Assignee: Aviation Communication & Surveillance Systems, LLC, Phoenix, AZ (US)

( * ) Notice: Subject to any disclaimer, the term of this patent is extended or adjusted under 35 U.S.C. 154(b) by 0 days.

(21) Appl. No.: 10/038,134

(22) Filed: Jan. 3, 2002

(65) Prior Publication Data

US 2003/0128151 A1 Jul. 10, 2003

(51) Int. Cl.$^7$ .............................................. G01S 13/93
(52) U.S. Cl. .............................. 342/29; 342/36; 342/37; 342/63
(58) Field of Search ....................... 342/29, 30, 31–32, 342/38, 36, 40, 361

(56) References Cited

U.S. PATENT DOCUMENTS

| | | | | |
|---|---|---|---|---|
| 4,853,700 A | * | 8/1989 | Funatsu et al. ............... | 342/30 |
| 5,081,457 A | | 1/1992 | Motisher et al. .............. | 342/40 |
| 5,107,268 A | | 4/1992 | Sturm et al. .................. | 342/36 |
| 5,235,336 A | | 8/1993 | Sturm et al. .................. | 342/30 |
| 5,264,853 A | | 11/1993 | Sturm et al. .................. | 342/30 |
| 5,280,285 A | | 1/1994 | Curtis et al. .................. | 342/32 |
| 5,317,316 A | | 5/1994 | Sturm et al. .................. | 342/30 |
| 5,321,406 A | | 6/1994 | Bishop et al. ................. | 342/32 |
| 5,689,266 A | | 11/1997 | Stelling et al. ............. | 342/165 |
| 5,920,277 A | * | 7/1999 | Foster et al. .................. | 342/32 |
| 5,923,293 A | | 7/1999 | Smith et al. ................. | 342/455 |
| 5,969,676 A | | 10/1999 | Tran et al. .................. | 342/442 |
| 6,160,497 A | | 12/2000 | Clark .......................... | 342/961 |
| 6,313,783 B1 | * | 11/2001 | Kuntman et al. ............. | 342/29 |

OTHER PUBLICATIONS

Thomas Williamson et al., Development and operation of the Traffic Alert and Collision Avoidance System (TCAS), Proceedings of the IEEE, vol.: 77 Issue: 11, Nov. 1989, Pp.: 1735–1744.*
Robert E. Boisvert et al., ADS–Mode S system overview, Digital Avionics Systems Conference, 12th DASC., AIAA/IEEE, Oct. 1993, Pp.: 104–109.*
Yong–Liang Wang et al., STAP with medium PRF mode for non–side–looking airborne radar, Aerospace and Electronic Systems, IEEE Transactions on, vol.: 36 Issue: 2, Apr. 2000, pp:609–620*

* cited by examiner

*Primary Examiner*—Thomas H. Tarcza
*Assistant Examiner*—Isam Alsomiri
(74) *Attorney, Agent, or Firm*—Stuart A. Whittington; William R. Bachand; Squire, Sanders & Dempsey LLP (57) ABSTRACT

An aircraft system and method for determining when to attempt acquisition of an intruder for active tracking. A link reliability score associated with the intruder is adjusted based upon the signal strength of transmissions, the frequency of the transmissions, and the number of previous attempts to acquire the intruder for active tracking.

13 Claims, 5 Drawing Sheets

METHOD OF DETERMINING RADIO FREQUENCY LINK RELIABILITY IN AN AIRCRAFT TRACKING SYSTEM

BACKGROUND OF THE INVENTION

The present invention relates generally to avionics for aircraft and more specifically to airborne collision avoidance systems and transponders.

Airborne collision avoidance systems provide protection from collisions with other aircraft. Conventional systems operate independently of ground-based air traffic control. The development of an effective airborne collision avoidance system (CAS) has been the goal of the aviation community for many years. In the late 1980's a system specification for airborne collision avoidance was developed with the cooperation of the airlines, the aviation industry, and the FAA. Systems compliant with this specification became known as the-Traffic Alert and Collision Avoidance System II (herein TCAS). Such systems were mandated by Congress to be installed on most commercial aircraft flying in U.S. airspace by the early 1990's. A chronology of the development of airborne collision avoidance systems may be found in "INTRODUCTION TO TCAS II", printed by the Federal Aviation Administration (FAA) of the U.S. Department of Transportation, March 1990, which is incorporated herein by reference.

Conventional TCAS equipment in a host aircraft listens for radio frequency (RF) transmissions from air traffic control transponders on aircraft in its vicinity. Some of the transmissions received by the host aircraft are unsolicited periodic transmissions (squitter) from other aircraft equipped with Mode S transponders; some are replies to interrogation requests made by the host aircraft (surveillance replies); and some are replies to interrogation requests made by other interrogators (aircraft or ground stations) in the vicinity, known as Frequency Replies Unsynchronized In Time (FRUIT). By computer analysis of these transmissions, the airborne TCAS equipment on the host aircraft determines which aircraft are "intruders," in that they may represent a potential collision threat. The TCAS equipment tracks the intruders, and if necessary, provides advisories about intruders to the flight crew to assure separation. Computer analysis of these transmissions can also be employed to passively track intruder aircraft that are too distant to track actively, and therefore not of immediate interest to the collision avoidance function.

TCAS equipment on the host aircraft may either passively track the squitter and FRUIT, or actively track (interrogate) the range of intruder aircraft to elicit a surveillance reply. Whether to commence active tracking of an intruder aircraft depends in part upon information about radio frequency communication reliability. Poor communication may be due to many factors, such as range to the intruder aircraft, RF interference, or shielded antenna paths, and is often associated with low RF signal strength.

In communication technologies (e.g., wired, wireless, radio, or optical) a message is understood by a receiver when it is received in accordance with a signaling protocol intended by the transmitter. Such a protocol may include for example a modulation scheme, a band of radio frequencies, and/or a frequency hopping technique. If the message is received, the transmitter and receiver are generally considered to be using (or sharing) a communication channel, herein also called a link. The link subsumes the signaling protocol and may also include higher level protocols generally associated with computer communications such as acknowledgements and network functions such as sharing of data and processing resources at the transmitter, the receiver, or both. The link may be transitory, persist for an exchange of messages, or.be presumed to be dedicated to particular transmitter(s) and receiver(s). Generally, a link is considered to no longer exist when one or more messages are not received properly; or when there is an indication that one of the transmitter and the receiver may not rely further on the existence of the link for its original purpose.

A conventional TCAS determines whether an RF link is robust enough to attempt acquisition of an intruder aircraft for active tracking, using a link reliability scoring algorithm as follows. Upon detecting an intruder via.receipt of an unsolicited DF=11 squitter, or a DF=17 Automatic Dependent Surveillance-Broadcast (ADS-B) squitter, a link reliability score is initialized for that intruder. Each time that a subsequent squitter or FRUIT is received from the intruder aircraft, the score is incremented by a predetermined, fixed value, which is based upon any previously unsuccessful acquisition attempts of the intruder aircraft. When the link reliability score reaches a predetermined threshold, acquisition of the intruder aircraft is attempted to acquire range information. The number of interrogations made during the acquisition attempt depends upon the number of previously unsuccessful acquisition attempts.

Problems are associated with this method of determining when to commence active tracking of an intruder aircraft. Specifically, this method frequently results in premature attempts to acquire a tracking of the intruder aircraft's range, and if range is acquired, an accurate tracking of range to the intruder aircraft may be difficult to maintain. That is, the link used by the host aircraft may not be robust enough for the host aircraft to acquire the track, and if the track is acquired, the link may not be robust enough to maintain continuous accurate information about the track. For instance, receipt of as few as three unsolicited replies within a 12-second interval may generally trigger an interrogation-intensive acquisition attempt. If the intruder is distant or the intruder's antenna is shielded, significant power may be transmitted by the host aircraft trying to acquire track information of an intruder aircraft. In accordance with the TCAS specification, RF transmissions may be subject to a maximum transmitted power during a prescribed time period (e.g., a budget or allocation). Subsequent tracking may consume a significant percentage of the power resources or power allocation available to the aircraft tracking system and may preclude timely acquisition and active tracking of other intruder aircraft using perhaps more reliable RF links.

An improved method of determining when to commence active tracking of an intruder aircraft is desirable. Without such a method, power may be wasted, important links neglected, critical advisories omitted, and hazardous flying conditions develop that may lead to a loss of life and destruction of property.

BRIEF SUMMARY OF THE INVENTION

The following summary of the invention is provided to facilitate an understanding of some of the innovative features unique to the present invention, and is not intended to be a full description. A full appreciation of the various aspects of the invention may only be gained by taking the entire specification, claims, drawing, and abstract as a whole.

The present invention includes a method for receiving a message or reply from a sender; for determining the signal strength of the message or reply; for determining the time interval that has elapsed since a prior signal from the sender was received; and for determining whether to attempt acquisition of the range of (distance to) the sender in accordance with the signal strength and the time interval measurements.

The present invention includes a system for use in an aircraft, comprising at least one input for accepting antenna signals, and a memory comprising indicia of instructions for performing the method described above.

Premature attempts at such an acquisition are avoided when the determination of whether to attempt an acquisition of a sender's range is based upon signal strength and upon the time spanning between received squitter. In addition, time, processing resources, and power may be better utilized as a consequence of avoiding maintenance of an unreliable RF link with the sender. Inaccurate communication may also be avoided with consequential improved system performance and reliability.

By employing signal strength and time interval measurement to determine whether to attempt an acquisition of the sender's range, the system has more resources for transmissions with other senders that are transmitting messages or replies with stronger signal strengths or that are transmitting messages or replies that are more frequently received.

By employing signal strength and time interval measurements to determine whether to attempt an acquisition of the sender's range, available power is not wasted and power allocations are more effectively utilized.

BRIEF DESCRIPTION OF THE DRAWINGS

Embodiments of the present invention will now be further described with reference to the drawing, wherein like designations denote like elements, and.

DETAILED DESCRIPTION OF THE INVENTION

An aircraft system according to various aspects of the present invention operates in a host aircraft to decide when to actively attempt acquisition of the range (for the purpose of tracking) of other aircraft in the vicinity (also known as intruder aircraft). This determination is made with reference to characteristics of squitter received from Mode S transponders in other aircraft.

The present invention determines which intruder aircraft to attempt to actively acquire range information for initiating active tracking of the aircraft or validating range derived from ADS-B squitters. An.aircraft equipped with a system of the present invention is capable of actively tracking the range of other aircraft reliably within approximately a 20 mile radius of itself.

The determination of which intruder aircraft to attempt to actively track also depends in part upon radio frequency (RF) link reliability. Poor RF link reliability may be due to many factors, such as range to the intruder aircraft, RF interference, or shielded antenna paths, and is often associated with low signal strength.

Figure 1:
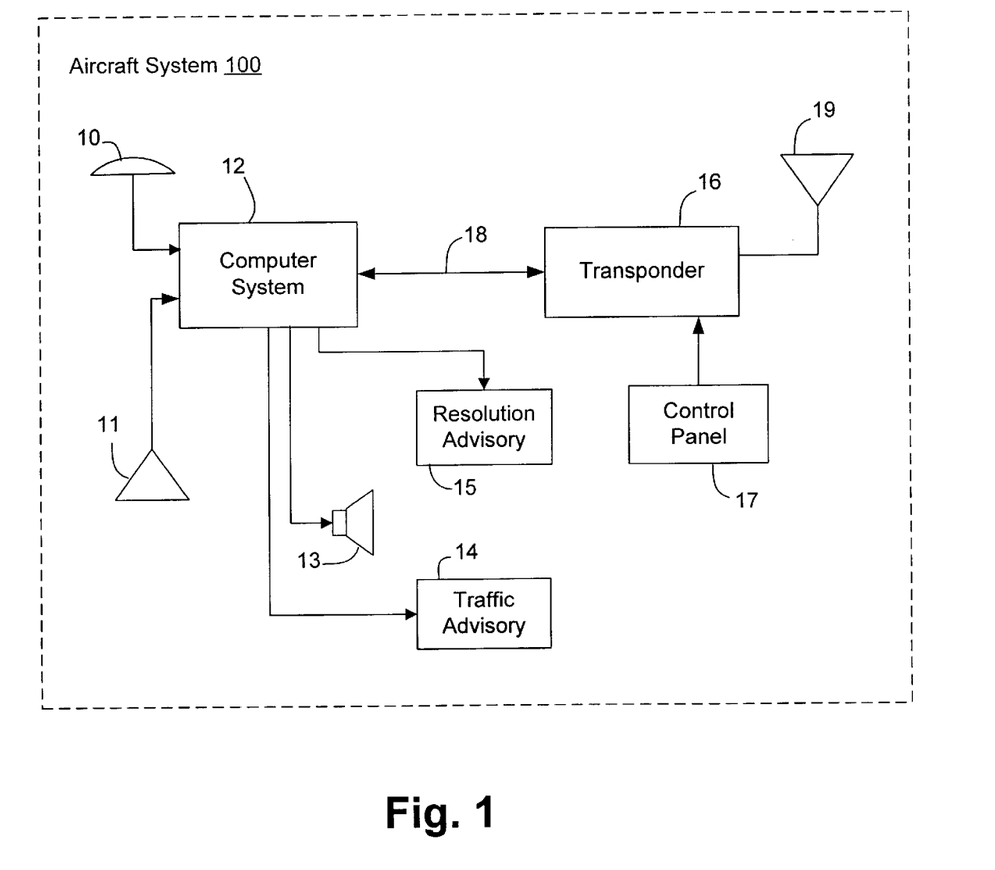
FIG. 1 is a diagram of an aircraft system in accordance with various aspects of the present invention.

Referring to FIG. 1, there is shown a block diagram of an aircraft system 100 of the present invention. System 100 includes a computer system 12, a transponder 16, a directional antenna 10, an omnidirectional antenna 11, an aural annunciator 13, a resolution advisory (RA) display 15, a traffic advisory (TA) display 14, a control panel 17, and a transponder antenna 19, all suitably coupled together.

Transponder 16 transmits electromagnetic signals via transponder antenna 19. Information conveyed by or derived from the electromagnetic signals includes range, altitude and bearing of the aircraft transmitting the signal. Transponder 16 may be of the type known as a Mode S transponder that additionally conveys on the electromagnetic signal the identifier of the aircraft transmitting the signal. Interrogations may be directed to a particular aircraft, using this aircraft identifier. That is, particular aircraft generally respond to interrogations directed to them and ignore interrogations not directed to them. A Mode-S transponder-equipped aircraft is also capable of transmitting a periodic transmission (squitter) to alert others of the aircraft's presence or convey position or other aircraft information.

Many other configurations of an aircraft system 100 are possible; for instance, it is possible for the TA and RA displays to be combined into one display (not shown). Further, it is possible to replace omni-directional antenna 11 with a directional antenna 10. Aircraft system 100 in one implementation complies with the Minimum Operation Performance Standard (MOPS) for Traffic Alert and Collision Avoidance System (TCAS), manual document number DO-185 or DO-185A published by RTCA, Inc., which is incorporated herein by reference.

Figure 2:
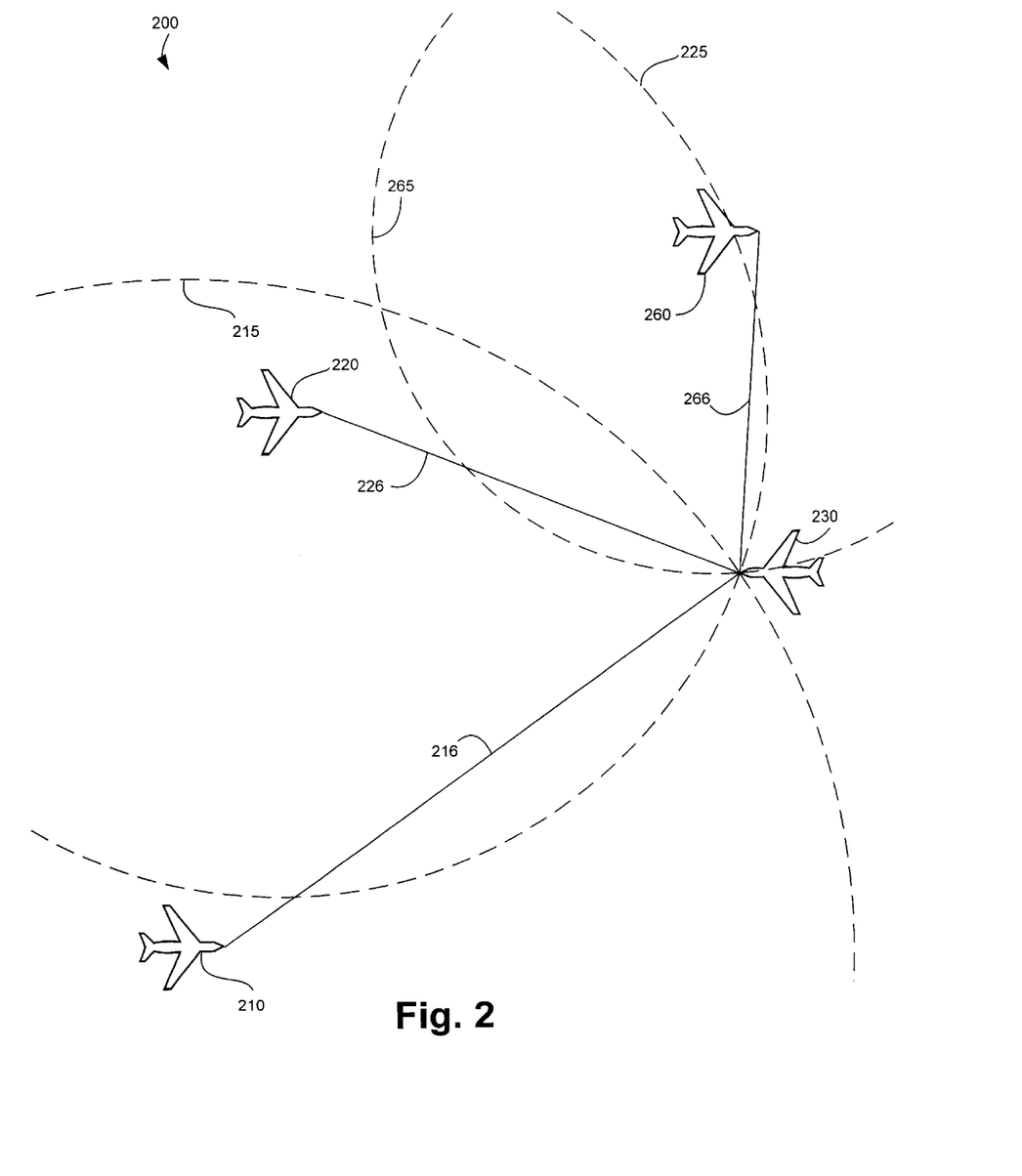
FIG. 2 is a diagram of signal paths received by a host aircraft in accordance with various aspects of the present invention.

Referring now to FIG. 2, an example of an in-flight situation 200 is illustrated, in which aircraft system 100 on host aircraft 230 performs a method in accordance with the present invention. From time to time signals 266, 226, and 216 from nearby aircraft 260, 220, and 210, respectively, are received by aircraft system 100 installed in aircraft 230. Aircraft system 100 receives squitter and/or FRUIT 266, 226, and 216, which are sent from aircraft within range 265, 225 and 215, respectively. Signals 216, 226, and 266 are shown transmitted by any type of antenna(s). Because signal strength generally decreases with distance, signal 266 is stronger than signal 226, and signal 226 is stronger than signal 216.

Host aircraft 230 may attempt to acquire an RF link with (i.e. actively track) all three aircraft; however, the characteristics of the squitter received by aircraft system 100 is employed by the present invention to determine with which aircraft an RF link is attempted. The decision depends in part upon the RF link reliability. RF link reliability may be predicted, in part, from the signal strength of the squitter received from an aircraft. Signal strength may suitably be an amplitude or power level measured at a particular time, or during a duration of measurement, or an integral, or average of such measurements.

RF link reliability may also be predicted, in part, from time interval measurements of the squitter received from the aircraft. Mode S transponders emit squitter at a regular periodic frequency (for instance, every second), but the squitter may not be received by the host aircraft when the intruder aircraft is beyond a 20 mile range or the signal path is obstructed. Thus, if an intruder aircraft flies in and then out of the 20 mile range of the host aircraft, the intruder aircraft's squitter will only be regularly received while the intruder emits squitter within the 20 mile range. Once the intruder is out of the 20 mile range, squitter will be received irregularly or not at all by the host aircraft. Since squitter is emitted at a periodic frequency, a time interval can be measured to indicate when the intruder is no longer within range for reliably maintaining a track.

An RF link is not attempted with an intruder aircraft until aircraft system 100 predicts that such a link will be reliable. Aircraft system 100 monitors the squitter until indicia representing the squitter time interval measurements and signal strengths accumulate to a given threshold. Once the given threshold is reached, an RF link is predicted to be reliable and aircraft system 100 attempts to acquire the range of the intruder aircraft for active tracking.

Thus power is conserved that might otherwise be spent acquiring an RF link to an aircraft when the associated RF link reliability scores are low; because, an RF link is attempted only when an associated RF link reliability score reaches a threshold.

Figure 3:
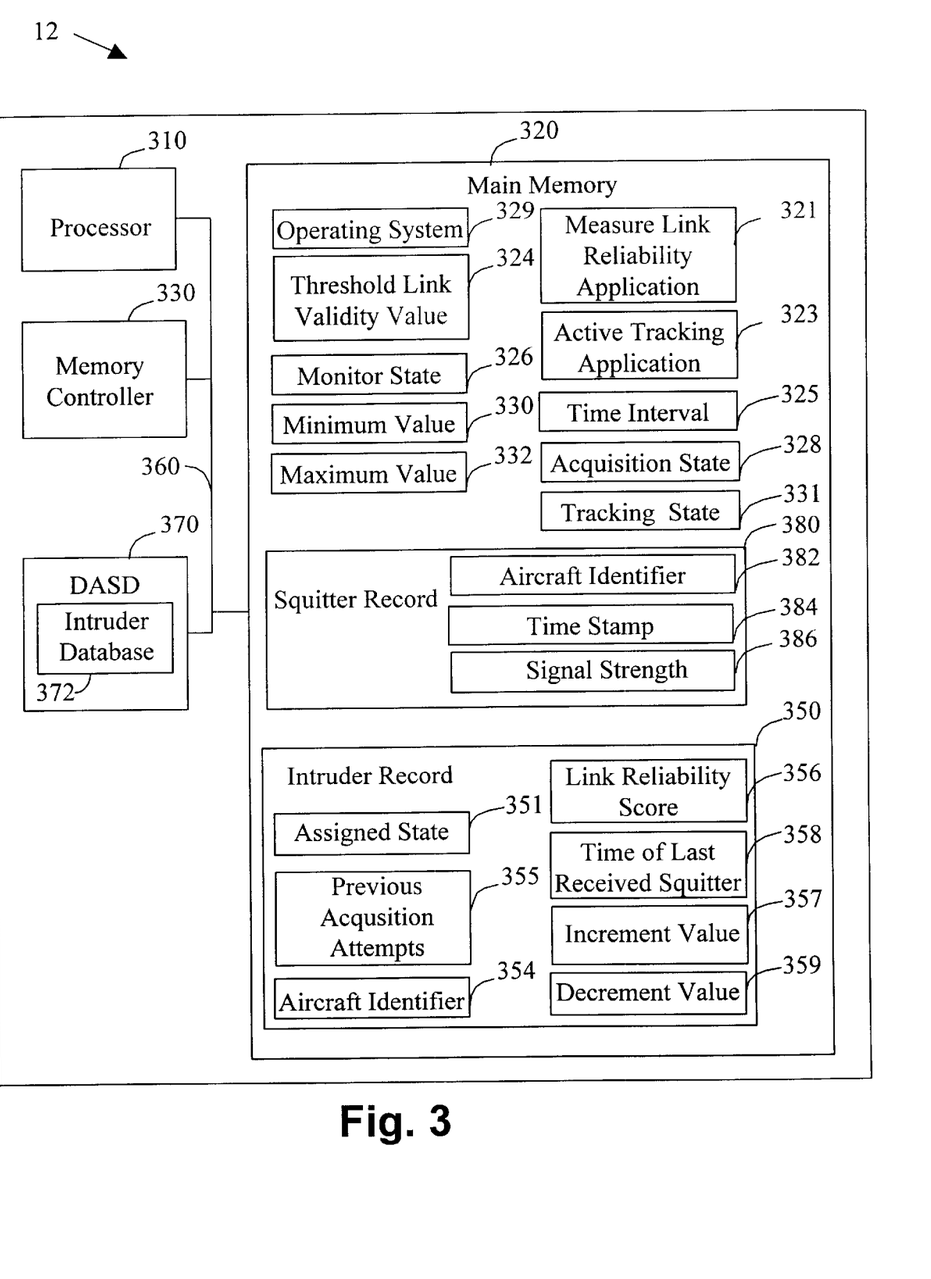
FIG. 3 is a diagram of a processor of the aircraft system of FIG. 1.

Referring now to FIG. 3, a computer system 12 of the aircraft system 100 of FIG. 1 is illustrated. Computer system 12 suitably comprises, e.g., a processor 310, a main memory 320, a memory controller 330, and a direct access storage device (DASD) 370, all of which communicate via a system bus 360. In one implementation, computer system 12 performs interrogation and provides resolution advisories (RA's) and traffic advisories (TA's) in any conventional manner (e.g., is compatible with RTCA Minimum Operation Performance Standard (MOPS) for Traffic Alert and Collision Avoidance System (TCAS II)).

Computer system 12 may be implemented by any computer technologies (e.g., circuits, firmware, operating system, and software) suitably adapted for performing methods for acquiring one or more links based on accumulating indicia of squitter characteristics and.comparing them to a threshold.

Processor 310 performs computation and control functions of computer system 12, and comprises a suitable central processing unit (CPU). Processor 310 may comprise.a single integrated circuit, such as a microprocessor, or may comprise any suitable number of integrated circuit devices and/or circuit boards working in cooperation to accomplish the functions of a processor. Processor 310 suitably executes computer applications stored in main memory 320.

Direct access storage device (DASD) 370 allows processor 310 to store and retrieve information from auxiliary storage devices, such one or more disks (e.g., magnetic disk, optical disk, or disk array).

Memory controller 330 moves requested information among main memory 320, DASD 370, and to and from processor 310. Memory controller 330 may be implemented as a separate entity. Portions of the function provided by memory controller 330 may, in various embodiments, be implemented in circuits packaged with processor 310, main memory 320, and/or DASD 370.

Main memory 320 and/or DASD 370 provide storage and read/write access to data and instructions used by processor 310. For example, main memory 320 and/or DASD 370 may include: an operating system 329, a threshold link validity value 324, a monitor state 326, a minimum value 330, a maximum value 332, a measure link reliability application 321, an active tracking application 323, a time interval field 325, an acquisition state 328, a tracking state 331, a squitter record 380, an aircraft identifier field 382, a time stamp 384, an intruder record 350, an assigned state field 351, a previous acquisition attempt field 355, an aircraft identifier field 354, a link reliability score field 356, a time of last received squitter field 358, a base increment value 357, a decrement value 359, a signal strength value field 386, and an intruder database 372. For convenience of reference, such database records and software applications are briefly described in Table 1.

TABLE 1

| Database, Record, Field or Application | Description |
|---|---|
| Measure Link Reliability Application 321 | Once an intruder is detected by receipt of squitter, measure link reliability application 321 creates an intruder record 350, stores the value of aircraft identifier 382 in aircraft identifier 354, stores a value of monitor state 326 in assigned state 351, and initializes the link reliability score 356. Link reliability score 356 is incremented by increment value 357 each time that an additional squitter or FRUIT is identified to that intruder. If link reliability score 356 exceeds a predetermined threshold link validity value 324 and assigned state 351 equals monitor state 326, measure link reliability application 321 stores acquisition state 328 in assigned state 351. If active tracking application 323 indicates that the intruder's assigned state 351 should be reset to monitor state 326, measure link reliability application 321 reinitializes link reliability score 356 and increments previous acquisition attempt value 355. For every surveillance interval in which no squitter or FRUIT is received, link reliability score 356 is decremented. When link reliability score 356 falls below a minimum value 330, and assigned state 351 equals monitor state 326, measure link reliability application 321 deletes the intruder record 350. |
| Intruder Database 372 | Intruder database 372 stores an intruder record 350 for each detected intruder. |
| Intruder Record 350 | Intruder database 372 stores an intruder record 350 associated with each detected intruder. Any number of intruder records 350 may be stored in main memory 320. |
| Aircraft Identifier Fields 354 and 382 | Aircraft identifier 382 includes the aircraft identifier information that is encoded in squitter or FRUIT received from a Mode S transponder. When measure link reliability application 321 creates an intruder record 350, the value of aircraft identifier 382 is stored in aircraft identifier 354. To determine if aircraft identifier 382 belongs to an intruder for which an intruder record 350 already exists, aircraft identifier 382 is matched against aircraft identifier 354. |
| Previous Acquisition Attempts Field 355 | The previous acquisition attempts field 355 is initialized to zero when an intruder record 380 is created, and incremented each time that active tracking application 323 indicates that the intruder's assigned state 351 should be set to monitor state 326. |
| Link Reliability Score Field 356 | Link reliability score 356 is initialized when an intruder record 350 is created. Link reliability score 356 is reinitialized when active tracking application 323 indicates that the intruder's assigned state 351 should be set to monitor state 326. Link reliability score 356 is incremented by increment value 357 each time that subsequent squitter or FRUIT is received for the intruder associated with intruder record 350, constraining the resulting link reliability to maximum value 332. Link reliability score 356 is decremented by decrement value 359 each time that an predetermined time interval passes without |

TABLE 1-continued

| Database, Record, Field or Application | Description |
|---|---|
| | receipt of squitter or FRUIT from the intruder associated with intruder record 350. |
| Increment Value Field 357 | When link reliability score 356 is initialized or reinitialized, increment value 357 is initialized, based upon the signal strength 386 of the squitter or FRUIT and on the number of previous acquisition attempts 355. Increment value 357 is employed to update the link reliability score 356 each time that subsequent squitter is identified to the same intruder. |
| Signal strength 386 | Signal strength 386 includes the signal strength of the squitter or FRUIT and is employed to initialize or reinitialize the link reliability score, and the increment value. |
| Squitter Record 380 | Squitter record 380 is created when squitter or FRUIT is received from other aircraft equipped with Mode S transponders, and processed by measure link reliability application 321 and active tracking application 323. Any number of records may be stored in memory 320. |
| Time of Last Received Squitter Field 358 | Time of last received squitter 358 may be updated when squitter associated with a particular intruder record 350 is received. Time of last received squitter 358 is employed by measure link reliability application 321 to determine decrement value 359 to subtract from link reliability score 356. |
| Threshold Link Validity Value Field 324 | Threshold link validity value 324 includes a value to which the link reliability score 356 is compared. If the link reliability score 356 for an intruder exceeds the threshold link validity value 324, then measure link reliability application 321 stores acquisition state 328 into assigned state 351 and active tracking application 323 attempts acquisition of the intruder. |
| Active Tracking Application 323 | Active tracking application 323 attempts acquisition and tracks intruders, once measure link reliability application 321 has determined that the link reliability score 356 for an intruder exceeds the threshold link validity value 324. |
| Time Interval Field 325 | Time interval 325 is employed by measure link reliability application 321 to determine the decrement value to subtract from the link reliability score 356 for a particular intruder. |
| Monitor State Field 326 | Measure link reliability application 321 sets an intruder's assigned state 351 to the value of monitor state 326, when an intruder record 350 is created, as well as when active tracking application 323 indicates that an intruder's assigned state 351 should be reset to monitor state 326. |
| Acquisition State Field 328 | When an assigned state 351 is equal to the value of monitor state 326 and the link reliability score 356 for an intruder record 350 exceeds the threshold link validity value 324, measure link reliability application 321 sets an intruder's assigned state 351 to the value of acquisition state 328. |
| Tracking State Field 331 | The assigned state 351 is changed to the value of tracking state 331 when the active tracking application 323 is successful in actively tracking the intruder. |
| Minimum Value 330 | Minimum value 330 includes a value to which the link reliability score 356 is compared. If the link reliability score 356 falls below the minimum value 330, then measure link reliability application 321 deletes the associated intruder record 350. |
| Maximum Value 332 | Maximum value 332 includes a value to which the link reliability score 356 is compared. If the value of the link reliability score 356 exceeds maximum value 332, maximum value 332 is stored into link reliability score 356. |
| Assigned State Field 351 | The assigned state 351 is employed by measure link reliability application 321 to determine whether an intruder associated with intruder record 350 is in monitor state 326, acquisition state 328, or tracking state 331. |
| Decrement Value Field 359 | Decrement value 359 is set to a value computed based on time interval 325 and employed to update the link reliability score 356 each time that a time interval 325 passes in which no subsequent squitter or FRUIT is identified to the same intruder. |
| Time Stamp Field 384 | Time stamp 384 is set with the current time when squitter or FRUIT is received and a squitter record 380 is created. |

Main memory 320 may be implemented in any combination of Dynamic Random Access Memory (DRAM), Static RAM (SRAM), flash memory, cache memory, and portions of DASD 370 (e.g., a swap file). Programs in main memory 320 may include any and all forms of computer programs, including source code, intermediate code, machine code, and any other representation or indicia of instructions.

Databases accessible by computer system 12 are indexed for efficient access by one or more applications performed by computer system 12. For example, intruder database 372 may include indices stored in whole or in part in an auxiliary storage device (e.g., DASD 370, memory 320). Often accessed records or portions of an index may be stored in memory 320.

Computer system 12 receives and processes squitter to determine when to commence an active tracking of a particular intruder. Determination is accomplished with reference to various software components discussed above.

Figure 4:
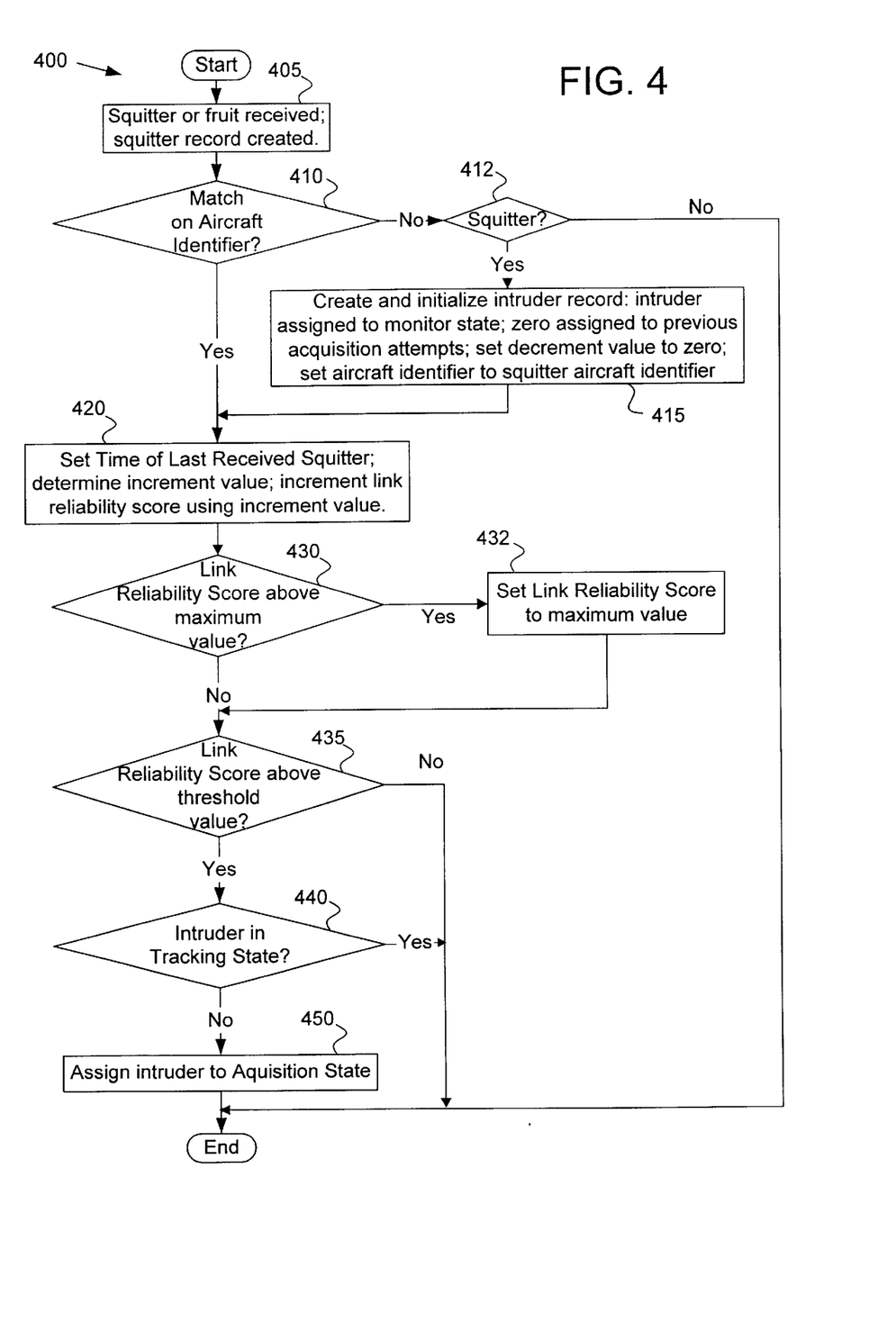
FIG. 4 is a first flow chart of the methodology for the radio frequency (RF) reliability scoring in accordance with an embodiment of the present invention.

The present invention describes a system and method for RF reliability scoring capable to determine whether an RF link is robust enough to attempt acquisition of the intruder aircraft for active tracking. Referring to FIG. 4, upon receiving squitter or FRUIT, measure link reliability application 321 creates a squitter record 380 that includes the aircraft identifier 382 from the squitter, as well as a time stamp 384 that indicates the time at which the squitter was received, and a signal strength 386 (405).

The signal strength 386 of the squitter record 380 is determined by averaging the digitized amplitude measurements of the four preamble pulses of the signal determined at reception of the signal at the antenna 11 or 12. Since the pulse detection/decoding circuitry characteristics of the hardware are known, the computed signal strength value 386 can be equated to the loss of signal amplitude during transmission from the known nominal transmission strength.

Measure link reliability application 321 employs aircraft identifier 382 to search the intruder records 350 on intruder database 372 determine if there is an intruder record 350 associated with aircraft identifier 382 (410). If no intruder record 350 associated with the signal exists in intruder database 372 (410=No), and if the received signal was FRUIT (412=No), no further action is taken by measure link reliability application 321.

If no intruder record 350 associated with the signal exists in intruder database 372 (410=No), and the received signal was a squitter (412), measure link reliability application 321 creates and stores an intruder record 350 in intruder database 372 (415). Measure link reliability application 321 sets assigned state 321 to a value of monitor state 326; sets previous acquisition attempts 355 to zero; sets decrement value to zero; and sets aircraft identifier 354 to aircraft identifier 382.

After an intruder record has been created (415), or if a match on aircraft identifier locates an existing intruder record in intruder database 372 (410=Yes), measure link reliability application 321 sets time of last received squitter 358 to time stamp 384; determines the increment value; and adjusts the link reliability score 356 using the increment value 357 (420). The increment value 357 is determined based upon the number of previous acquisition attempts 355 and the signal strength 386 of the squitter. See Table 2 for the relationship of increment value 357 to perceived signal loss through space derived from signal strength measurements.

TABLE 2

| Previous Unsuccessful Acquisition Attempts | Signal Strength ⇒ | | | |
|---|---|---|---|---|
| | Less than −74 dBm | −74 or greater but less than −57 dBm | −57 or greater but less than −40 dBm | Greater than −40 dBm |
| | | | Increment Value | |
| 0 | 6 | 8 | 12 | 16 |
| 1 | 2 | 4 | 6 | 8 |
| 2 | 1 | 2 | 3 | 4 |
| >2 | 0 | 1 | 2 | 2 |

Because the increment value is determined based, in part, upon the signal strength 386, using a lower increment value 357 than the prior art upon detection of a transmission with weak signal strength 386 results in the requirement of a greater number of transmissions from the intruder before initiating acquisition. Thus, the acquisition attempt is delayed when the signal strength of the transmission is weak, thereby improving the chances of acquiring, establishing and maintaining a track. In this manner, aircraft power available for interrogations is conserved.

A predetermined maximum value 332 may be employed to contain the link reliability score 356 within a fixed range (430). That is, after the increment value 357 is added to the link reliability score 356 (420), a determination is made as to whether the link reliability score 356 exceeds the maximum value 332 (430). For instance, the maximum value 332 may be 50. If the link reliability score 356 does exceed the maximum value 332 (430=Yes), then the maximum value 332 is assigned to link reliability score 356 to keep it within a predetermined allowable range (432).

A determination is made whether the link reliability score 356 exceeds the threshold link validity value 324(435). For instance, the threshold link validity value may be 40. If the link reliability score 356 does not exceed threshold link validity value 324 (435=no), then no action is taken to change the intruder's assigned state 351.

If the link reliability score 430 exceeds the threshold link validity value 324 (435=yes), then a.determination is made as to whether the intruder's assigned state 351 equals tracking state 331 (440). If the intruder's assigned stated 351 is not in tracking state (440=No), then the intruder's assigned state 351 is given a value of Acquisition State 328 (450).

If the intruder's assigned state 351 is already equal to tracking state 331 (440=yes), then no action is taken to change the intruder's assigned state 351.

When the next squitter is received, process (400) begins again, and another squitter record is created (405). An intruder record 350 on intruder database 372 that has an aircraft identifier 354 that matches the aircraft identifier 382 can be located (410=Yes), and the information from the intruder record 350 is employed to further adjust the link reliability score 356 (420) and determine whether to change the intruder's assigned state 351 (430–440).

When an intruder's assigned state is changed to acquisition state 328 (450), active tracking application 323 attempts to acquire the range of the aircraft associated with the intruder record through active interrogation of the aircraft.

If the acquisition attempt is successful, then while active tracking application 323 is actively tracking the aircraft, the assigned state 351 remains equal to tracking state 331 (440=Yes). Squitter received for an aircraft that is actively being tracked is still processed by process 400. The increment value 357 continues to be adjusted (420) and the link reliability score 346 continues to be incremented by the increment value 357 (420). However, because the intruder's assigned state 351 is equal to tracking state 331 (440=Yes), no further action is taken while an intruder is being tracked.

Conditionally, active tracking application 323 may change the assigned state 351 back to monitor state 326; reinitialize the link reliability score; and either increment the number of previous acquisition attempts by one or reinitialize the number of previous acquisition attempts to zero. The number of previously unsuccessful acquisition attempts will be incremented if the acquisition attempt was unsuccessful (no reply is received). The conditions for reinitializing the number of previous acquisition attempts to zero include: (1) if the acquisition attempt is successful, but the active tracking application's 323 tracking has reached capacity and the intruder is considered less significant than those already being tracked; (2) the intruder is being tracked, but is removed from the tracking state to make room to track a more significant intruder; and (3) while in track state no replies are received for several consecutive time intervals.

Figure 5:
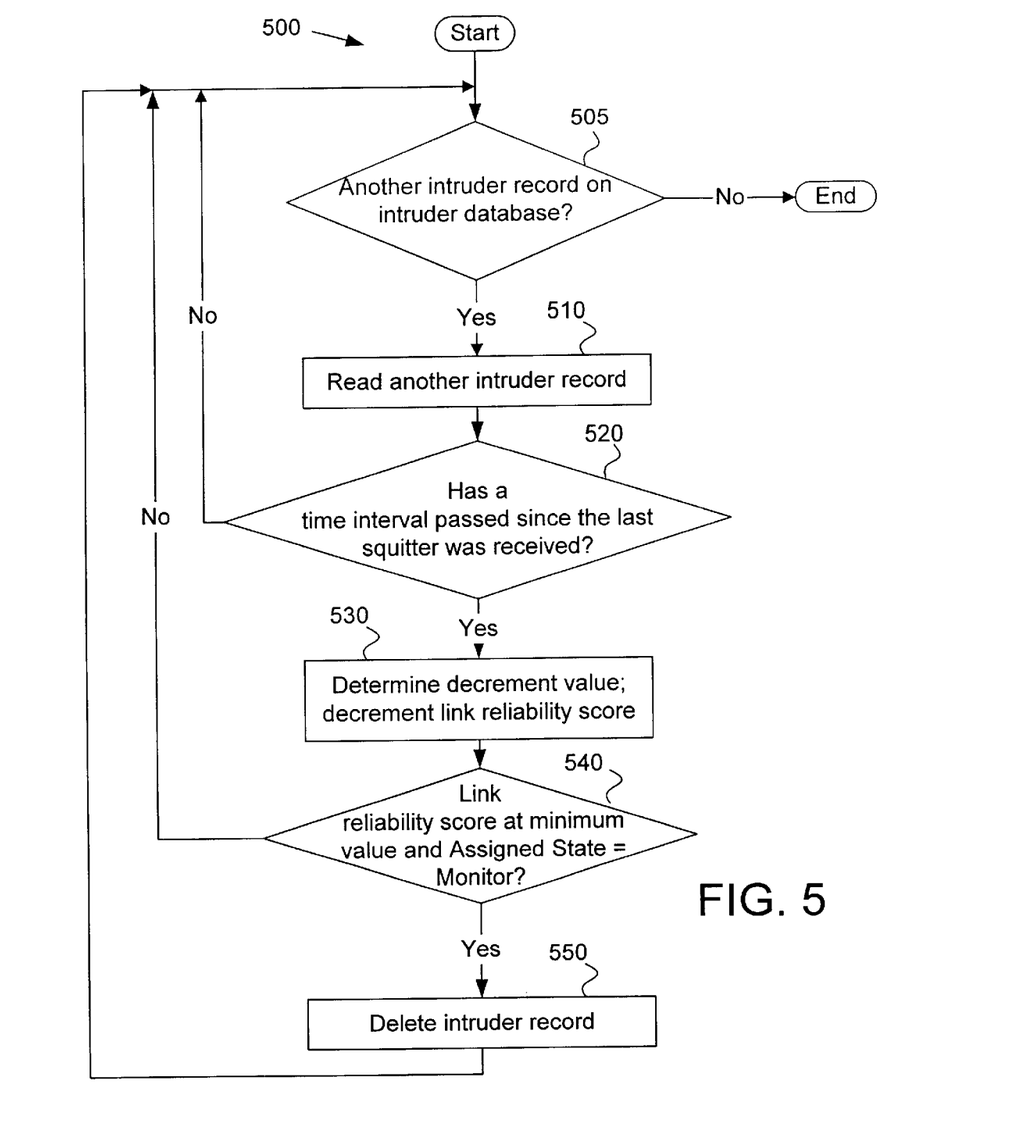
FIG. 5 is a second flow chart of the methodology for the radio frequency (RF) reliability scoring in accordance with an embodiment of the present invention.

Referring now to FIG. 5, another process (500) that conditionally decrements link reliability score 356 runs concurrent to the process (400) processing incoming squitter. Method 500 runs continuously as long as there are intruder records 350 on intruder database 372 (505=yes).If process 500 ends because no more intruder records 350 exist on intruder database 372, then process is restarted when the next intruder record 350 is added to intruder database 372 (415 in process 400).

For each intruder record read (510), time of last received squitter 358 may be employed to determine if a predetermined time interval 325 has passed. If a predetermined time interval 325 has passed (520=yes), then no squitter has been received for an entire surveillance interval. In this case, decrement value 359 is determined based on the time interval 325. See Table 3 for the relationship of decrement value 359 to time interval since last received squitter.

TABLE 3

| Time Interval Since Last Squitter Received (Seconds) | Decrement Value |
|---|---|
| Less than 1 | 0 |
| At least 1 but less than 2 | 1 |
| At least 2 but less than 4 | 2 |
| At least 4 but less than 8 | 3 |
| At least 8 | 4 |

Decrement value is subtracted from the link reliability score 356 (530). In this manner, squitter nearly out of range (some in range and some out of range) may be handled such that a greater number of in-range squitter may be required prior to attempting acquisition of the intruder.

If the link reliability score 356 falls below a minimum value 330 (540=yes) and the assigned state 351 equals monitor state 326, then the intruder record 350 is deleted from intruder database 372. For instance, the minimum value 330 may be zero.

Employing the system and method of the present invention, the link reliability score 356 both determines when an attempt at tracking an intruder should occur and when a non-tracked intruder should be removed from the TCAS system.

There are numerous advantages realized by the use of aircraft system 100 described above. For example, the instances of premature acquisition attempts are reduced. Premature attempts at acquisition and subsequent active tracking interrogation may significantly consume the interrogation power resources available to the aircraft tracking system and preclude timely acquisition or active tracking of intruder aircraft with more reliable RF links.

Other variations and modifications of the present invention will be.apparent to those of skill in the art, and it is the intent of the appended claims that such variations and modifications be covered. For example, while the exemplary embodiment covers a link reliability score employed to determine the ability of the RF link to sustain active interrogations and their solicited replies, the system and method can be extended to the employment of a link reliability score for determining the strength of the RF link for passive tracking as well.

For instance, new RF messages have been defined for broadcast of aircraft position and other data. These messages are called ADS-B extended squitters: Automatic Dependent Surveillance-Broadcast. The extended squitters are transmitted by appropriately equipped Mode S transponders and can be received by TCAS at lower power levels than standard squitters, permitting tracking of intruders too distant to track actively and therefore not of interest to the collision avoidance function. In order to preclude premature attempts at tracking using these unsolicited messages, a link reliability score is separately maintained for the ADS-B link in a very similar manner as the active link reliability score.

Further, other link reliabilty scores may be maintained for other types of RF messages received by TCAS as well, such as TIS-B or FIS-B. The active and passive link reliability scores, along with other criteria, may also be used in determining when a passive track should transition to active and vice versa. It is intended that the scope of the present invention be defined by the appended claims.

What is claimed is:

1. A system in a first aircraft for avoiding collision with a second aircraft, the system comprising:
   a. means for receiving first and second signals each identifiable to the second aircraft;
   b. means for adjusting a score toward a threshold value with a first value for the first signal and with a second value for the second signal, the first value being determined in accordance with signal strength of the first signal and the second value being determined in accordance with signal strength of the second signal;
   c. means for adjusting the score away from the threshold value with a third value determined in accordance with a time interval between the first and the second signals;
   d. means for maintaining a track of the second aircraft after the score has crossed the threshold; and
   e. means for providing a traffic advisory in accordance with the track, the traffic advisory for alerting a pilot of the first aircraft to avoid collision with the second aircraft.

2. The system of claim 1 wherein the first and second signals are identifiable to the second aircraft by virtue of indicia contained in the first and second signals comprising an identification of the second aircraft.

3. The system of claim 1 wherein at least one of the first and second signals comprise radar transmission of a Mode S type.

4. The system of claim 1 wherein at least one of the first and second signals comprise at least one of a reply, a squitter, an Automatic Dependent Surveillance Broadcast (ADS-B) squitter, and a Frequency Replies Unsynchronized In Time (FRUIT) transmission.

5. The system of claim 1 wherein signal strength corresponds to at least one of amplitude at a particular time, power at a particular time, amplitude during a duration of measurement, power during a duration of measurement, an integral of amplitude, an integral of power, an average of a plurality of amplitude measurements, and an average of a plurality of power measurements.

6. The system of claim 1 wherein the time interval corresponds to an integer quantity of squitter transmission intervals.

7. The system of claim 1 wherein the first value is in a range from 0% to 40% of the threshold value.

8. The system of claim 1 wherein the third value is in a range from 0% to 10% of the threshold value.

9. The system of claim 1 wherein the track comprises indicia of identification of the second aircraft in association with at least one of estimated position, velocity, range, range rate, altitude, and bearing.

10. The system of claim 9 wherein at least one of estimated position, velocity, range, range rate, altitude, and bearing is obtained in response to interrogation by the means for maintaining the track.

11. A method performed in a first aircraft for avoiding collision with a second aircraft, the method comprising:
    receiving first and second signals each identifiable to the second aircraft;
    adjusting a score toward a threshold value with a first value for the first signal and with a second value for the second signal, the first value being determined in accordance with signal strength of the first signal and the second value being determined in accordance with signal strength of the second signal;
    adjusting the score away from the threshold value with a third value determined in accordance with a time interval between the first and the second signals;
    acquiring a track of the second aircraft after the score has crossed the threshold; and
    providing a traffic advisory in accordance with the track, the traffic advisory for alerting a pilot of the first aircraft to avoid collision with the second aircraft.

12. A memory comprising indicia of the method of claim 11.

13. A traffic alert and collision avoidance system comprising the memory of claim 12.

* * * * *